United States Patent
Suzuki et al.

(10) Patent No.: US 6,797,398 B2
(45) Date of Patent: Sep. 28, 2004

(54) PLASTIC FILM FOR MEDICAL LIQUID CONTAINER

(75) Inventors: Tokoaki Suzuki, Tokyo (JP); Koichi Miura, Tokyo (JP)

(73) Assignee: Fujimori Kogyo Co., Ltd., Tokyo (JP)

(*) Notice: Subject to any disclaimer, the term of this patent is extended or adjusted under 35 U.S.C. 154(b) by 0 days.

(21) Appl. No.: 10/312,505

(22) PCT Filed: Jun. 27, 2001

(86) PCT No.: PCT/JP01/05499

§ 371 (c)(1),
(2), (4) Date: Dec. 27, 2002

(87) PCT Pub. No.: WO02/00434

PCT Pub. Date: Jan. 3, 2002

(65) Prior Publication Data

US 2003/0124370 A1 Jul. 3, 2003

(30) Foreign Application Priority Data

Jun. 28, 2000 (JP) .................... 2000-194255

(51) Int. Cl.$^7$ ............................. B32B 27/32
(52) U.S. Cl. ................................ 428/516; 428/213
(58) Field of Search ................ 428/516, 213; 525/240

(56) References Cited

U.S. PATENT DOCUMENTS

| 4,210,686 A | 7/1980 | Gajewski et al. |
| 5,998,019 A | 12/1999 | Rosenbaum et al. |
| 6,127,043 A * | 10/2000 | Lange .................. 428/515 |
| 6,268,062 B1 * | 7/2001 | DeMeuse ................ 428/461 |
| 2003/0099792 A1 * | 5/2003 | Andersson et al. ....... 428/35.2 |

FOREIGN PATENT DOCUMENTS

| EP | 0 229 475 A | 7/1987 |
| JP | 8-252298 A | 10/1996 |
| JP | 9-75444 A | 3/1997 |
| JP | 9-85913 A | 3/1997 |
| JP | 9-262948 A | 10/1997 |
| JP | 9-308682 A | 12/1997 |
| JP | 9-308683 A | 12/1997 |
| JP | 10-323381 A | 12/1998 |
| JP | 11-290422 A | 10/1999 |
| JP | 2000-14747 A | 1/2000 |
| JP | 2000-33674 A | 2/2000 |
| WO | WO 95/13918 A1 | 5/1995 |

OTHER PUBLICATIONS

JP-09-262948, machine translation from JPO web site (1997).*

* cited by examiner

Primary Examiner—D. Lawrence Tarazano
(74) Attorney, Agent, or Firm—Birch, Stewart, Kolasch & Birch, LLP

(57) ABSTRACT

A plastic film for medical liquid containers which includes at least thee layers, each layer not containing non-elastomeric block copolymer of benzene-ring-free olefin and propylene, such that the first layer, which is composed mainly of propylene homopolymer, the second layer, which contains polypropylene resin, polyethylene resin, and thermoplastic elastomer, and the third layer, which functions as a sealing layer and is composed mainly of copolymer of propylene and other monomers, are laminated without the aid of bonding layer, with the second layer acting as an intermediate layer.

13 Claims, 1 Drawing Sheet

FIG.1

PLASTIC FILM FOR MEDICAL LIQUID CONTAINER

This application is the national phase under 35 U.S.C. §371 of PCT International Application No. PCT/JP01/05499 which has an International filing date of Jun. 27, 2001, which designated the United States of America.

TECHNICAL FIELD

The present invention relates to a plastic film for medical liquid containers and more particularly to a plastic film suitable for use as a material from which to form medical liquid containers such as bags for transfusions, drug solutions, and blood.

BACKGROUND ART

There have been proposed a variety of materials from which to form medical liquid containers to hold transfusions, drug solutions, and the like. For example, there is disclosed in Japanese Patent Laid-open No. Hei 8-252298, a plastic film for medical liquid containers which is composed of an oriented plastic surface layer, an adhesive resin layer, an oriented polyethylene or polypropylene layer, and a sealant layer directly fusion-bonded to the oriented polyethylene or polypropylene layer. The layers are directly laminated to each other without any anchoring agent and adhesives interposed between them. There is also disclosed in Japanese Patent Laid-open No. Hei 9-75444, a base material for medical use in which the layers contain a block copolymer composed of a random copolymer composed mainly of propylene and a polymer composed mainly of α-olefin other than propylene. There is disclosed in Japanese Patent Laid-open No. Hei 9-85913 a plastic film for liquid containers which is composed of a transparent base film and a polypropylene-based film laminated on at least one side of the transparent base film, the latter being incorporated with syndiotactic polypropylene, isotactic polypropylene copolymerized with ethylene, and/or olefin-based elastomer.

Moreover, there is disclosed in Japanese Patent Laid-open No. Hei 9-308682, a plastic film for medical liquid containers which has a sealant layer composed of at least two layers of mixed film directly laminated to each other without any adhesives interposed between them. The films are formed from a mixture of high-density polyethylene having a density no lower than 941 kg/m$^3$ and linear low-density polyethylene having a density of 900–940 kg/m$^3$ in varied mixing ratios. There is also disclosed in Japanese Patent Laid-open No. Hei 9-308683 a plastic film for medical liquid containers which has a sealant layer composed of at least two layers of mixed film directly laminated to each other without any adhesives interposed between them. The films are formed from a mixture of high-density polyethylene having a density no lower than 941 kg/m$^3$ and linear low-density polyethylene having a density of 900–940 kg/m$^3$ in varied mixing ratios. The sealant layer is laminated to the upper and lower sides of a transparent film, with adhesives interposed between them, such that the transparent film is bonded to the mixed film layer in which the mixing ratio of the high-density polyethylene is lower.

In addition, there is disclosed in Japanese Patent Laid-open No. Hei 10-323381 a medical container formed from a multi-layered film constructed of an intermediate layer and an inner layer directly adjacent to the inside thereof. The intermediate layer is formed from a mixture of ethylene-vinyl alcohol copolymer and styrene resin. The inner layer is formed from any of a resin composed mainly of modified polyolefin, a first mixed resin composed mainly of modified polyolefin and styrene resin, and a second mixed resin composed mainly of polypropylene resin and styrene resin. There is also disclosed in Japanese Patent Laid-open No. Hei 11-290422 a transfusion container formed from a multilayered sheet composed of an outer layer and an inner layer. The outer layer contains a polymer composition of polypropylene block copolymer and hydrogenated butadiene-styrene polymer. The inner layer contains any of (a) polypropylene block copolymer, (b) polypropylene random copolymer, and (c) polymer composition of the polypropylene block copolymer or polypropylene random copolymer and hydrogenated butadiene-styrene polymer. The melting point of the outer layer is higher than the melting point of the inner layer by 10° C. or more.

Moreover, there is disclosed in Japanese Patent Laid-open No. 2000-14747 a medical container having a triple-layered wall which is constituted such that the inner and outer layers are composed mainly of high-density polyethylene (HOPE) and the intermediate layer is composed mainly of linear low-density polyethylene (LLDPE), with the total thickness of the inner and outer layers being no larger than 80 μm and no smaller than 10 μm. The HOPE has a density no lower than 945 kg/m$^3$ and a peak temperature no lower than 125° C. (measured by a differential scanning calorimeter). The LLDPE is obtained by means of metallocene catalyst having a density of no lower than 925 kg/m$^3$ and no higher than 935 kg/m$^3$. There is disclosed in Japanese Patent Laid-open No. 2000-33674, a medical container of multi-layered laminate film at least composed of a first layer (as the inner most layer), second layer (as a bonding layer), and third layer. The first layer is formed from a mixture of polypropylene and/or polyethylene resin and styrene resin. The second layer is formed from modified polyolefin, and a third layer is formed from ethylene-vinyl alcohol copolymer on the outer side of the first layer.

None of the disclosed plastic films for medical liquid containers, however, do not meet all the requirements for heat resistance, transparency, haze, heat-sealability, drop strength, impact strength, and flexibility. The laminate film having a bonding layer such as adhesives and adhesive resin tends to permit organic matters to dissolve in the content liquid. The plastic film of propylene block copolymer is hazy (or poor in transparency) although it is improved in drop strength and impact strength. High haze prevents the inspection of the content liquid.

The disadvantage of the film incorporated with a thermoplastic elastomer for improvement in film flexibility is that the thermoplastic elastomer presented on the surface layer causes sticking and hampers handling. Moreover, such thermoplastic elastomer whitens immediately after sterilization with high-pressure steam, thereby preventing the inspection of the content liquid. Moreover, the thermoplastic elastomer (excluding propylene-based elastomer) contained in the innermost layer (in contact with liquid) causes not only whitening and sticking but also tends to permit organic matters to dissolve in the content liquid. This is undesirable for medical containers. The container with an intermediate layer containing elastomer, such as mixed layer with ethylene-vinyl alcohol copolymer, has improved gas barrier properties for existence of ethylene-vinyl alcohol copolymer but is subject to whitening upon sterilization with high-pressure steam. Whitening prevents the inspection of content liquid.

Moreover, the container with an intermediate layer formed from elastomer alone is subject to whitening as well as dissolution in the content liquid and it is high in production cost. The plastic film for medical liquid containers should preferably be capable of high-frequency fusion cutting and sealing from the standpoint of efficient operation if it is to be fabricated into containers by using the existing bag-making machines for polyvinyl chloride materials.

DISCLOSURE OF INVENTION

The present invention was completed in view of the foregoing. It is an object of the present invention to provide a plastic film for medical liquid containers which is characterized by such properties as weak tendency toward whitening by sterilization with high-pressure steam, ability to permit the inspection of content liquid immediately after sterilization with high-pressure steam, freedom from sticking (which leads to easy handling of the resulting containers), good flexibility, high drop strength and impact strength, insolubility in the content liquid upon sterilization with high-pressure steam at 121° C., nontoxicity, ability to be fabricated into safe medical liquid containers, and capability of heat-sealing as well as high-frequency fusion-sealing (which permits fabrication by the existing bag-making machine for polyvinyl chloride materials). These properties are required of the material from which the medical liquid containers are fabricated.

To achieve the above-mentioned object, the present invention is directed to a plastic film for medical liquid containers which includes at least three layers, each layer not containing non-elastomeric block copolymer of benzene-ring-free olefin and propylene, such that the first layer, which is composed mainly of propylene homopolymer, the second layer, which contains polypropylene resin, polyethylene resin, and thermoplastic elastomer, and the third layer, which functions as a sealing layer and is composed mainly of copolymer of propylene and other monomers, are laminated without the aid of bonding layer, with the second layer acting as an intermediate layer.

According to a preferable embodiment, the first layer is composed mainly of a propylene homopolymer which is a mixture of two or more kinds of propylene homopolymer in a ratio of from 1:9 to 9:1 (by weight), the first one having a melt flow rate of 0.1–5 g/10 min at 230° C. and a density of 880–913 kg/m$^3$, and the second one having a melt flow rate of 5–50 g/10 min at 230° C. and a density of 880–913 kg/m$^3$, such that the resulting mixture has a melt flow rate no higher than 5 g/10 min at 230° C.

According to another preferred embodiment, the second layer is composed of 50–85 parts by weight of the polypropylene resin, 5–30 parts by weight of the polyethylene resin, and 10–40 parts by weight of the thermoplastic elastomer. In addition, the polypropylene resin contained in the second layer is a random copolymer of propylene and ethylene, with the ethylene content being 5–30% by weight; the polyethylene resin contained in the second layer is a linear low-density polyethylene having a melt flow rate of 0.1–10 g/10 mm at 190° C. and a density of 850–980 kg/m$^3$; and the thermoplastic elastomer contained in the second layer is a styrene-based elastomer.

According to a further preferred embodiment, the second layer contains a resin capable of high-frequency dielectric heating, so that it permits high-frequency fusion cutting and sealing. The resin capable of high-frequency dielectric heating should preferably be a polyamide resin.

According to another preferred embodiment, the third layer contains a copolymer which is a random copolymer of propylene and ethylene, with the ethylene content being 5–30% by weight. The copolymer contained in the third layer should preferably be a random copolymer of propylene which has a melt flow rate of 1–8 g/10 min at 230° C. and a density of 850–980 kg/m$^3$. The copolymer of propylene and other monomers which is contained in the third layer should preferably be a non-elastomeric copolymer of propylene and other monomers, a propylene-based elastomer, or a mixture of the non-elastomeric copolymer and the propylene-based elastomer.

According to another preferred embodiment, the plastic film for medical liquid containers has a total light transmission no lower than 85% (according to JIS K7105) and a haze value no higher than 25% according to JIS K7105) measured immediately after sterilization with high-pressure steam at 121° C. for 30 minutes. According to a further preferred embodiment, the plastic film for medical liquid containers has a tensile elastic modulus no higher than 300 MPa according to JIS K7127) measured immediately after sterilization with high-pressure steam at 121° for 30 minutes.

According to another preferred embodiment, the first layer has a thickness of 5–20 μm, the second layer has a thickness of 100–300 μm, and the third layer has a thickness of 30–120 μm.

According to the present invention, the plastic film for medical liquid containers does not contain in any of its layers a non-elastomeric block copolymer of benzene-ring-free olefin and propylene. Therefore, it has high transparency and low haze and is free from whitening and clouding. It undergoes very little whitening after sterilization with high-pressure steam at 121° C. In addition, it has good heat resistance because its first layer is composed mainly of propylene homopolymer. This first layer contributes to the film cutting ability (without stringing) at the time of high-frequency fusion cutting and sealing.

In addition, the second layer as an intermediate layer contains most of the thermoplastic elastomer which causes a problem of dissolution. This imparts non-sticky feel and gets around whitening and dissolution due to sterilization with high-pressure steam at 121° C. The fact that the second layer contains, in addition to a thermoplastic elastomer, polypropylene resin (PP resin for short hereinafter) and polyethylene resin (PE resin for short hereinafter) effectively prevents whitening and contributes to cost reduction.

Moreover, the third layer, which functions as a sealing layer, is composed mainly of a copolymer of propylene and other monomers. This provides sufficient heat-sealing strength. The plastic film is fabricated into medical liquid containers in such a way that the third layer becomes the innermost layer. Thus, the resulting medical liquid containers have sufficient drop strength and impact strength.

According to the present invention, these layers are laminated on top of the other without the help of a bonding layer. Therefore, the medical liquid containers formed from the plastic film of the present invention are exempt from problems of dissolution in the content liquid by adhesives or adhesive resin after sterilization with high-pressure steam. In addition, the thermoplastic elastomer which causes a problem of dissolution is confined mainly in the second layer which functions as an intermediate layer and the resin capable of high-frequency dielectric heating is also confined in the second layer. This avoids problems of dissolution from the thermoplastic elastomer and the resin capable of high-frequency dielectric heating.

According to the present invention, the propylene homopolymer constituting the first layer is a mixture of two or more kinds of propylene homopolymer. A first propylene homopolymer (A) has a melt flow rate (MFR for short hereinafter) of 0.1–5 g/10 min at 230° C. and a density of 880–913 kg/m³. A second propylene homopolymer (B) has an MFR of 5–50 g/10 min at 230° C. and a density of 880–913 kg/m³. They are mixed in a ratio (A:B) of from 1:9 to 9:1 such that the resulting mixture has an MFR no higher than 5 g/10 min at 230° C. Such a mixture is superior in film-forming properties and gives rise to a strong film. Incidentally, MFR is measured according to JIS K7210.

In addition, the second layer may contain a mixture of 50–85 parts by weight of the PP resin, 5–30 parts by weight of the PE resin, and 10–40 parts by weight of the thermoplastic elastomer. The PP resin contained in the second layer may be a random copolymer of propylene and ethylene, with the ethylene content being 5–30% by weight. In this case, the medical liquid container formed from the plastic film is superior in impact resistance, drop strength, transparency, and haze. Restricting the ratio of thermoplastic elastomer in the second layer as mentioned above effectively contributes to cost reduction.

In addition, the PE resin contained in the second layer may be a linear low-density polyethylene (LLDPE for short hereinafter) having an MFR of 0.1–10 g/10 min at 190° C. and a density of 850–980 kg/m³, or the thermoplastic elastomer contained in the second layer may be a styrene-based elastomer. This contributes to prevention of whitening and improvement in transparency and haze.

Moreover, the second layer may contain, in addition to the mixture resin, a resin capable of high-frequency dielectric heating so that the resulting plastic film is suitable for high-frequency fusion cutting and sealing. In this case, the plastic film can be fabricated into medical liquid containers by means of the existing bag making machine for polyvinyl chloride materials. Such a bag making machine can perform film cutting and peripheral sealing simultaneously. The resin capable of high-frequency dielectric heating may be a polyamide resin. In this case, it is possible to achieve better sealability by high-frequency fusion cutting and sealing. The fact that the resin capable of high-frequency dielectric heating is confined in the second layer (as an intermediate layer) and isolated by the third layer prevents the resin from dissolving in the content liquid.

Moreover, the copolymer contained in the third layer may be a random copolymer of propylene and ethylene, with the ethylene content being 5–30% by weight, or a random copolymer having an MFR of 1–8 g/10 min at 230° C. and a density of 850–980 kg/m³. In this case, the resulting plastic film is much better in seal strength, impact strength, and drop strength.

In addition, the third layer may contain a copolymer of propylene with other monomers, the copolymer being selected from (a) non-elastomeric copolymer of propylene with other monomers, (b) propylene-based elastomer, and (c) a mixture of (a) and (b) mentioned above. In this case, the resulting plastic film is further improved in flexibility, impact strength, and drop strength. Of thermoplastic elastomers, the propylene-based elastomer is preferable because it causes no problems with sticking, whitening, and dissolution. The third layer containing such an elastomer is safe and easy to handle when it is in contact with the medical liquid. Incidentally, according to the present invention, the third layer is composed mainly of a copolymer of propylene with other monomers; however, it may be incorporated with any olefin-based elastomer (other than the propylene-based elastomer) in an amount not harmful to the effect of the present invention as a matter of course.

According to another preferred embodiment, the plastic film for medical liquid containers has a total light transmission no lower than 85% (according to JIS K7105) and a haze value no higher than 25% (according to JIS K7105) measured immediately after sterilization with high-pressure steam at 121° C. for 30 minutes. According to a further preferred embodiment, the plastic film for medical liquid containers has a tensile elastic modulus no higher than 300 MPa (according to JIS K7127) measured immediately after sterilization with high-pressure steam at 121° C. for 30 minutes. In this case, the plastic film gives rise to medical liquid containers which hardly subject to whitening due to ordinary sterilization with high-pressure steam and which readily permits the inspection of content liquid immediately after sterilization with high-pressure steam. This contributes to total cost reduction in the production line.

Furthermore, the first layer may have a thickness of 5–20 μm, the second layer may have a thickness of 100–300 μm, and the third layer may have a thickness of 30–120 μm. In this case, the plastic film is superior in flexibility and gives rise to the medical liquid containers which have good drop strength and are protected from dissolution from the thermoplastic elastomer in the second layer and the resin capable of high-frequency dielectric heating.

As mentioned above, the plastic film for medical liquid containers as covered in the present invention is superior in transparency, flexibility, non-sticky touch, heat resistance, strength, and sealability. It gives rise to medical liquid containers superior in flexibility, impact strength, and drop strength, and free from dissolution in the content liquid upon sterilization with high-pressure steam. In addition, it is non-toxic and hardly subject to whitening immediately after sterilization with high-pressure steam. This facilitates the rapid inspection of the content liquid immediately after sterilization with high-pressure steam. The medical liquid containers can be formed by high-frequency fusion cutting and sealing. Thus, the plastic film of the present invention is useful as a material from which to make medical liquid containers.

BEST MODE FOR CARRYING OUT THE INVENTION

Figure 1:
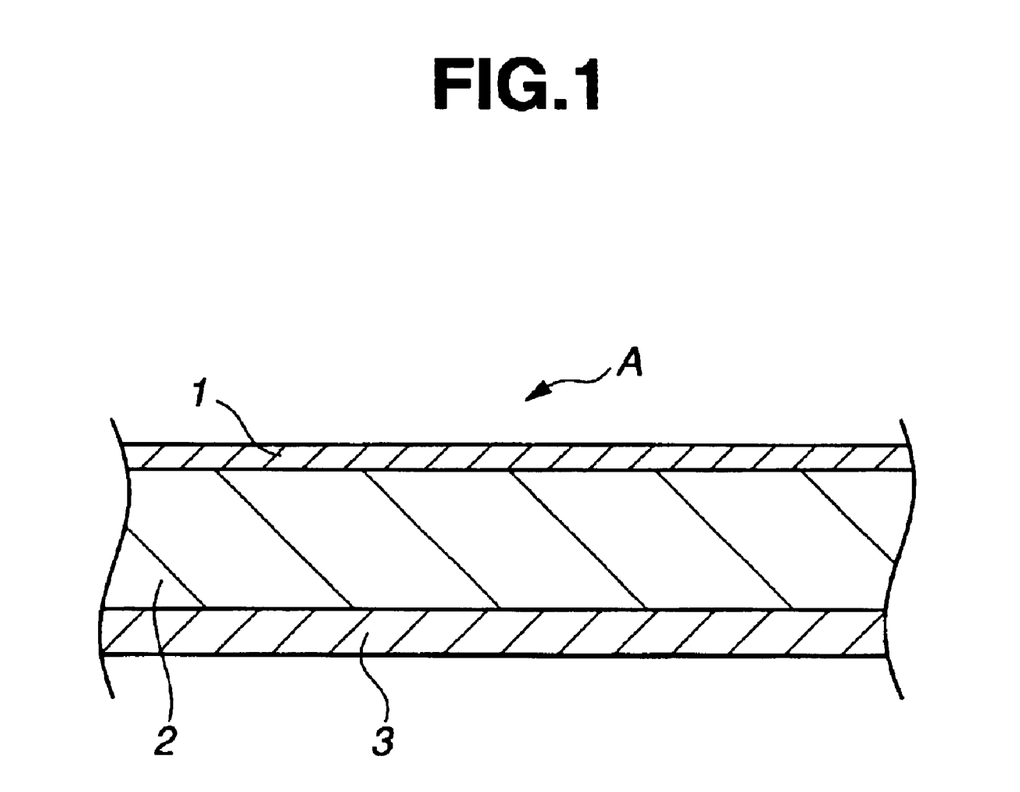
FIG. 1 is a partly enlarged sectional view illustrating the structure of the plastic film for medical liquid containers according to the present invention.

In what follows, the invention will be described in more detail with reference to the accompanying drawing. FIG. 1 is a longitudinal sectional view of the plastic film for medical liquid containers; it is intended to illustrate an example of the present invention. The plastic film A is a triple-layered laminate film composed of a surface layer (first layer) 1 of propylene homopolymer (PP homopolymer for short hereinafter), an intermediate layer (second layer) 2 of a mixture of PP resin, PE resin, and thermoplastic elastomer, and a sealing layer (third layer) 3 composed mainly of propylene-based random copolymer (PP copolymer for short hereinafter). These layers are laminated on top of the other without any adhesives or adhesive resin interposed between them.

The PP homopolymer constituting the surface layer 1 is not specifically restricted in its properties so long as it does not impede fusion cutting and sealing and is suitable for use as a material from which to make medical liquid containers. It may be a sheer PP homopolymer or a mixture of two or more kinds of PP homopolymer which has an MFR at 230° C. no higher than 5 g/10 min. The latter case is desirable in consideration of heat resistance, fusion cutting and sealing, film forming properties, and film strength.

In the case where the surface layer 1 is formed from a mixture of two or more kinds of PP homopolymer, their combination is not specifically restricted. A preferred combination of two kinds of PP homopolymer is such that a first one (A) has an MFR of 0.1–5 g/10 min (particularly 0.5–4 g/10 min) at 230° C. and a density of 880–913 kg/m$^3$ and a second one (B) has an MFR of 5–50 g/10 min (particularly 6–20 g/10 min) at 230° C. and a density of 880–913 kg/m$^3$. Their mixing ratio (A:B) should preferably be from 1:9 to 9:1 by weight, particularly from 2:8 to 8:2 by weight. In consideration of film processability, mixing should preferably be carried out such that the resulting mixture as a whole has an MFR no higher than 5 g/10 min (particularly 2–5 g/10 min) at 230° C. An enhanced effect will be produced if the polypropylene is manufactured with the aid of metallocene catalyst.

Incidentally, it is not always necessary that the surface layer 1 be formed from PP homopolymer alone; the PP homopolymer may be mixed with, for example, a random copolymer of olefin and propylene so long as the mixture does not harm the characteristic properties of the surface layer. The mixed resin should preferably contain PP homopolymer in a ratio no less than 50% by weight, particularly no less than 70% by weight.

The surface layer 1 is not specifically restricted in thickness; a thickness of 5–20 μm, particularly 6–18 μm, is desirable. With an excessively thin thickness, the surface layer is poor in heat resistance or high-frequency fusion cutting and sealing performance; with an excessive thickness, the surface layer lacks flexibility and is poor in impact strength and drop strength. The thickness of the first layer should preferably be no more than 10% of the total thickness of the plastic film.

The mixed resin constituting the intermediate layer 2 is a mixture of PP resin, PE resin, and thermoplastic elastomer. The PP resin may be PP homopolymer; however, it should preferably be a random copolymer of propylene with other monomers in view of flexibility, drop strength, and impact strength. If "other monomer" is ethylene, the resulting mixture has good transparency, which is desirable. In this case, the ethylene content in the copolymer is not specifically restricted; however, it is usually 5–30% by weight, preferably 10–20% by weight. With an excessively high ethylene content, the resulting mixed resin is rubber-like; and with an excessively low ethylene content, the resulting mixed resin is poor in flexibility, drop strength, and impact strength. Incidentally, the random copolymer of propylene and ethylene is commercially available from MITSUBISHI CHEMICAL CORPORATION under a trade name of SPX #8000 series.

On the other hand, the PE resin contained in the intermediate layer 2 may be any one of low-density polyethylene, medium-density polyethylene, ultra-low-density polyethylene, and high-density polyethylene. It should preferably be LLDPE in consideration of the drop strength of the medical liquid container or the whitening which the medical liquid container would suffer after sterilization with high-pressure steam. In this case, the LLDPE should be one which has an MFR of 0.1–10 g/10 mm, preferably 1–7 g/10 mm, at 190° C. and a density of 850–980 kg/m$^3$, preferably 850–940 kg/m$^3$, more preferably 880–940 kg/m$^3$. A better effect is obtained if the polyethylene is manufactured with the aid of a metallocene catalyst.

The thermoplastic elastomer contained in the intermediate layer 2 is not specifically restricted in its type so long as it is usable as a material from which to fabricate medical liquid containers. It includes those which are based on styrene, olefin, vinyl chloride, urethane, ester, amide, chlorinated polyethylene, syn-1,2-polybutadiene, trans-1,4-polyisoprene, and fluorine. Particularly preferred examples are styrene-based elastomers such as polystyrene-vinylpolyisoprene, polystyrene-hydrogenated vinylpolyisoprene, polystyrene-vinylpolyisoprene-polystyrene, polystyrene-hydrogenated vinylpolyisoprene-polystyrene, polystyrene-ethylenebutene, polystyrene-ethylenebutene-polystyrene, polystyrene-ethylenepropylene, polystyrene-ethylenepropylene-polystyrene, polystyrene-propylenebutene, polystyrene-propylenebutene-polystyrene, hydrogenated polystyrene-butadiene, hydrogenated polystyrene-butadiene-hydrogenated polystyrene, polystyrene-ethylenebutylene, polystyrene-ethylenebutylene-polystyrene, polystyrene-ethylenebutylene-polyethylene, polystyrene-ethylenebutylene-polypropylene, polystyrene-ethylenepropylene-polyethylene, polystyrene-ethylenepropylene-polypropylene, polystyrene-ethylenebutene-polyethylene, polystyrene-ethylenebutene-polypropylene, polystyrene-propylenebutene-polyethylene, and polystyrene-propylenebutene-polypropylene.

The mixed resin constituting the intermediate layer 2 is not specifically restricted in the mixing ratio of PP resin, PE resin, and thermoplastic elastomer. A preferred mixing ratio is such that PP resin is 50–85 parts by weight, PE resin is 5–30 parts by weight, and thermoplastic elastomer is 10–40 parts by weight. In other words, the ratio (by weight) of PP resin:PE resin:elastomer should be 50–85:5–30:10–40, particularly 55–80:6–24:12–30. With an excess amount of PP resin, the resulting film will be poor in flexibility. With an excess amount of PE resin, the resulting film will suffer whitening after sterilization with high-pressure steam. With an excess amount of thermoplastic elastomer, the resulting film will suffer whitening immediately after retort treatment and dissolution in the content liquid. The mixing ratio of the thermoplastic elastomer in the second layer should be no more than 30% by weight in view of cost reduction.

The intermediate layer 2 may be formed from the above-mentioned mixed resin alone; however, it may also be incorporated with a resin capable of high-frequency dielectric heating. This is desirable because the resulting film becomes capable of high-frequency fusion cutting and sealing. Examples of such a resin include PVC, phenolic resin, melamine resin, epoxy resin, polyhydric alcohol, acrylate resin, EVOH, EVA, EMA, EMMA, EAA, EEA, EMAA, polyurethane, polyester, amide wax, trihexyl butylcitrate, polyether nylon, styrene elastomer, ethylene-acid anhydride-comonomer copolymer, polyester elastomer, and polyamide resins (such as 6-nylon, 66-nylon, 12-nylon, 6,12-nylon, 6,66-nylon, and dimer acid-based polyamide resin). Of these examples, polyamide resins are preferable.

In the case where the above-mentioned mixed resin is incorporated with a resin capable of high-frequency dielectric heating, the amount of the resin should preferably be no more than 10% by weight, particularly 4–5% by weight, of the total amount of the intermediate layer 2. An excess amount improves the ability of high-frequency dielectric heating; however, it causes a problem of dissolution in the content liquid.

The thickness of the intermediate layer 2 is not specifically restricted; an adequate thickness is 100–300 μm, particularly 120–200 μm. With an excessively small thickness, the resulting film does not have necessary flexibility and strength. With an excessively large thickness, the resulting film increases in production cost and suffers whitening after sterilization with high-pressure steam for the result of the relatively large content of elastomer.

The PP copolymer constituting the seal layer 3 may be a random copolymer of propylene with other monomers. "Other monomers" are not specifically restricted; however, ethylene is desirable in view of whitening (after sterilization with high-pressure steam) and drop strength because the plastic film is used to form medical liquid containers. The ethylene content in the random copolymer is not specifically restricted; however, it is usually 5–30% by weight, preferably 10–20% by weight. With an excessively high ethylene content, the copolymer becomes rubber-like, and with an excessively low ethylene content, the copolymer does not fully contribute to flexibility, drop strength, and impact strength. In consideration of seal strength, the PP copolymer should preferably be one which has an MFR of 1–8 g/10 min, particularly 1.5–6 g/10 min, at 230° C. and a density of 850–980 kg/m$^3$, particularly 880–940 kg/m$^3$.

Incidentally, any commercially available random copolymer of propylene with ethylene may be used for the seal layer 3.

The seal layer 3 may be formed from only the above-mentioned random copolymer of propylene and other monomers. However, it may also be formed from the above-mentioned propylene elastomer alone or the above-mentioned random copolymer in conjunction with a propylene elastomer in an adequate ratio. The latter case contributes to improvement in flexibility, impact strength, and drop strength. A desirable propylene elastomer is one which is composed of hard segment and soft segment as explained below. Examples of the hard segment include polypropylene and a mixture of polypropylene and polyethylene (or polyolefin other than polypropylene). Examples of the soft segment include hydrogenated butadiene rubber, EPDM, EPM, EBM, NBR, butyl rubber, natural rubber, and nitrile rubber.

Other examples of the propylene elastomer include polymer alloy and cross-linked polyolefin alloy. The polymer alloy includes reactor TPO being prepared by polymerization of polypropylene with EPR (Ethylene-Propylene Rubber) in a multi-stage reactor. Any commercially available propylene elastomer may be used as in the case of the above-mentioned random copolymer of propylene with ethylene. Incidentally, the seal layer 3 is composed mainly of the above-mentioned copolymer of propylene with other monomers; however, the copolymer may be incorporated with an olefin elastomer (other than propylene elastomer) which includes a hard segment (polyethylene) and a soft segment as mentioned above, so long as it does not have an adverse effect on the present invention.

In the case where the above-mentioned PP copolymer is incorporated with a propylene elastomer, the ratio of the latter should preferably be 5–98% by weight, particularly 10–95% by weight, of the total amount of the seal layer 3. With an excessively small amount, it does not provide sufficient flexibility and drop strength. Incidentally, in the present invention, it is possible to form the seal layer 3 only with a propylene elastomer (such as propylene reactor TPO) as mentioned above.

The thickness of the seal layer 3 is not specifically restricted; it is usually 30–120 μm, preferably 35–100 μm. An excessively small thickness hampers sufficient sealing performance and causes dissolution into the content liquid from the thermoplastic elastomer incorporated into the intermediate layer 2 or the resin capable of high-frequency dielectric heating. An excessively large thickness hampers sufficient flexibility or prevents sufficient heat transfer to the sealing surface at the time of high-frequency sealing from the resin for high-frequency dielectric heating incorporated into the intermediate layer 2.

As mentioned above, the plastic film A for medical liquid containers includes the surface layer 1, the intermediate layer 2, and the seal layer 3, which are laminated on top of the other. These layers are not specifically restricted in the ratio of layer thickness. It is desirable that each layer is in the range of thickness specified above and the thickness (c) of the surface layer 1 is no larger than 10% of the thickness of the film A.

The plastic film A for medical liquid containers is constructed as mentioned above, and it is not specifically restricted in its physical properties. However, it should preferably have a total light transmission (according to JIS K7105) no lower than 85%, particularly no lower than 90%, a haze value (according to JIS K7105) no higher than 25%, particularly no higher than 20%, and a tensile modulus (according to JIS K7127) no higher than 300 MPa, preferably 10–300 MPa, more preferably 50–200 MPa, all measured immediately after sterilization with high-pressure steam at 121° C. for 30 minutes, so that the resulting medical liquid containers permit rapid inspection of content immediately after sterilization with high-pressure steam.

The plastic film A for medical liquid containers is not specifically restricted in its film-making method. Since it is formed by lamination without the aid of bonding layer of adhesives or adhesive resin, it is desirable to employ co-extrusion T-die method or co-extrusion inflation method. In the latter case, the water-cooled system is desirable.

The plastic film A for medical liquid containers is not restricted to the above-mentioned triple-layer structure. It may have additional layers of polyester, polypropylene, polyamide, PVDC, polyethylene, etc. so long as they have no adverse effect on its function and characteristic properties.

The plastic film A for medical liquid containers may be formed into bags for transfusions or intravenous (IV) solutions. In this case, it is made into a bag by heat-sealing at 150–240° C. with a heat-seal bag-making machine in such a way that the seal layer 3 becomes the innermost layer of the bag. Then the bag is provided with a capped inlet for the content liquid (IV solution). Alternatively, heat sealing may be replaced by fusion-cutting and sealing by high-frequency (10–40 MHz) dielectric heating by using a high-frequency dielectric heating bag-making machine. The resulting bag is filled with transfusion through the inlet and the cap is closed or sealed. The filled bag undergoes sterilization with high-pressure steam at 105–121° C. for 30–60 minutes. Now the transfusion is ready for storage and transportation.

The bag for transfusion which is formed from the plastic film A for medical liquid containers is hardly subject to whitening due to sterilization with high pressure steam. Therefore, it permits rapid and continuous inspection of the content liquid (IV solution) immediately after sterilization with high-pressure steam. Thus, it is possible to continuously carry out a series of steps for bag making, filling of the content liquid, sterilization with high pressure steam, and inspection of the content liquid. These steps may be accomplished on an automated line. Unlike the conventional product, the bag thus obtained does not take a long time (say, 24–72 hours) for its whitening to recover after sterilization with high-pressure steam. This leads to a reduction in total production cost.

The present invention is not limited to the above-mentioned constitution, but various changes and modifications may be made in the invention without departing from the spirit and scope thereof.

EXAMPLE

The plastic film for medical liquid containers according to the present invention will be described with reference to the following examples, which are not intended to restrict the scope of the invention.

Examples 1 to 7 and Comparative Examples 1 and 2

In Examples 1 to 7 and Comparative Examples 1 and 2, samples of plastic film for medical liquid containers were prepared from the compositions shown in Tables 1 to 3 by the co-extrusion T-die method. Each sample was tested, immediately after sterilization with high-pressure steam at 121° C. for 30 minutes, for total light transmission (JIS K7105), haze (JIS K7105), and tensile elastic modulus (JIS K7127). Each sample was also tested according to The Test Methods for Plastic Containers for the Japanese Pharmacopoeia Thirteenth Edition "Plastic containers for aqueous injection" to see if it is suitable for use as a material of medical liquid containers. Each sample was also tested for total organic carbon (TOC) according to JIS K0101. The results of the tests are shown in Tables 1 to 3. Incidentally, the test for dissolution was conducted by heating a bag containing 200 ml of purified water in an autoclave at 121° C. for 1 hour. This bag has an inside area of 15 cm×20 cm (600 cm$^2$).

In Tables 1 to 3, the resin constituting the first layer is specified as follows.

[1] Polypropylene homopolymer having an MFR of 2.7 g/10 min at 230° C. and a density of 900 kg/m$^3$, from Idemitsu Petrochemical Co., Ltd.

[2] Polypropylene homopolymer having an MFR of 7.5 g/10 min at 230° C. and a density of 900 kg/m$^3$, from GRAND POLYMER Co., Ltd.

[3] Polypropylene homopolymer having an MFR of 16.5 g/10 min at 230° C. and a density of 910 kg/m$^3$, from Japan Polychem Corporation.

Also, the resin constituting the second layer is specified as follows.

[1] Ethylene-propylene random copolymer with an ethylene content of 20% by weight having an MFR of 3.1 g/10 min at 230° C. and a density of 890 kg/m$^3$, from MITSUBISHI CHEMICAL CORPORATION.

[2] Ethylene-propylene random copolymer with an ethylene content of 20% by weight having an MFR of 3.2 g/10 min at 230° C. and a density of 890 kg/m$^3$, from MITSUBISHI CHEMICAL CORPORATION.

[3] LLDPE having an MFR of 2.0 g/10 min at 190° C. and a density of 922 kg/m$^3$, from Idemitsu Petrochemical Co., Ltd.

[4] LLDPE having an MFR of 0.7 g/10 min at 190° C. and a density of 926 kg/m$^3$, from Idemitsu Petrochemical Co., Ltd.

[5] LLDPE having an MFR of 3.5 g/10 min at 190° C. and a density of 907 kg/m$^3$, from JAPAN POLYOLEFINS Co., Ltd.

[6] Thermoplastic elastomer (styrene-based) composed of polystyrene and hydrogenated vinyl-polyisoprene with a styrene content of 20% by weight, having an MFR of 0.7 g/10 min at 230° C. and a density of 900 kg/m$^3$, from KURARAY CO., LTD.

[7] Thermoplastic resin capable of high-frequency dielectric heating, which is a dimer acid-based polyamide resin having a density of 950 kg/m$^3$ and a softening point of 100° C., from Henkel Japan Ltd.

Also, the resin constituting the third layer is specified as follows.

[1] Ethylene-propylene random copolymer with an ethylene content of 20% by weight having an MFR of 3.1 g/10 min at 230° C. and a density of 890 kg/m$^3$, from MITSUBISHI CHEMICAL CORPORATION.

[2] Propylene-based elastomer (or propylene reactor TPO) having an MFR of 3.2 g/10 min at 230° C. and a density of 890 kg/m$^3$, from MITSUBISHI CHEMICAL CORPORATION.

TABLE 1

| | | Example 1 | Example 2 | Example 3 |
|---|---|---|---|---|
| Film construction | | | | |
| First layer | [1] PP homopolymer | 70% by weight | 50% by weight | 70% by weight |
| | [2] PP homopolymer | 30% by weight | 50% by weight | 30% by weight |
| | [3] PP homopolymer | — | — | — |
| Second layer | [1] Polypropylene resin | 70% by weight | 70% by weight | 65% by weight |
| | [2] Polypropylene resin | — | — | — |
| | [3] Polyethylene resin | 10% by weight | — | 10% by weight |
| | [4] Polyethylene resin | — | 10% by weight | — |
| | [5] Polyethylene resin | — | — | — |
| | [6] Thermoplastic elastomer | 20% by weight | 20% by weight | 20% by weight |
| | [7] Resin capable of high-frequency dielectric heating | — | — | 5% by weight |
| Third layer | [1] Ethylene-propylene random copolymer | 100% by weight | 100% by weight | 100% by weight |
| | [2] Propylene elastomer | — | — | — |
| Layer thickness (μm) 1$^{st}$ layer, 2$^{nd}$ layer, 3$^{rd}$ layer | | 18, 130, 42 | 18, 130, 42 | 18, 130, 42 |
| Physical properties | | | | |
| Transparency (%) | | 90.5 | 91 | 91 |
| Haze (%) | | 10 | 14 | 15 |
| Tensile modulus (MPa) | | 220 | 240 | 260 |

TABLE 1-continued

|  | Example 1 | Example 2 | Example 3 |
| --- | --- | --- | --- |
| Test for containers of aqueous injection | | | |
| Residue on ignition (judgment) | 0.02% (pass) | 0.04% (pass) | 0.02% (pass) |
| Heavy metal (judgment) | ND (pass) | ND (pass) | ND (pass) |
| Lead (judgment) | ND (pass) | ND (pass) | ND (pass) |
| Cadmium (judgment) | ND (pass) | ND (pass) | ND (pass) |
| Foaming (judgment) | <3 min (pass) | <3 min (pass) | <3 min (pass) |
| pH (judgment) | <0.1 (pass) | <0.1 (pass) | <0.2 (pass) |
| Substance reduced by potassium permanganate (judgment) | <0.2 ml (pass) | <0.1 ml (pass) | <0.1 ml (pass) |
| UV (220–241 nm) (judgment) | <0.01 (pass) | <0.01 (pass) | <0.01 (pass) |
| UV (241–350 nm) (judgment) | <0.01 (pass) | <0.01 (pass) | <0.01 (pass) |
| Residue after evaporation (judgment) | <0.5 mg (pass) | <0.5 mg (pass) | <0.5 mg (pass) |
| Cytotoxicity test (judgment) | >100% (pass) | >100% (pass) | >100% (pass) |
| TOC | <1 ppm | <1 ppm | <1 ppm |
| Drop test (see note) | Five drops without break | Five drops without break | Five drops without break |

TABLE 2

|  |  | Example 4 | Example 5 | Example 6 | Example 7 |
| --- | --- | --- | --- | --- | --- |
| Film construction | | | | | |
| First layer | [1] PP homopolymer | 80% by weight | 95% by weight | 70% by weight | 70% by weight |
|  | [2] PP homopolymer | 20% by weight | — | 30% by weight | 30% by weight |
|  | [3] PP homopolymer | — | 5% by weight | — | — |
| Second layer | [1] Polypropylene resin | 65% by weight | 70% by weight | — | — |
|  | [2] Polypropylene resin | — | — | 70% by weight | 70% by weight |
|  | [3] Polyethylene resin | 10% by weight | — | 10% by weight | 5% by weight |
|  | [4] Polyethylene resin | — | — | — | — |
|  | [5] Polyethylene resin | — | 15% by weight | — | — |
|  | [6] Thermoplastic elastomer | 25% by weight | 15% by weight | 20% by weight | 20% by weight |
|  | [7] Resin capable of high-frequency dielectric heating | — | — | — | 5% by weight |
| Third layer | [1] Ethylene-propylene random copolymer | 10% by weight | 100% by weight | 10% by weight | 10% by weight |
|  | [2] Propylene elastomer | 90% by weight | — | 90% by weight | 90% by weight |
| Layer thickness (μm) 1st layer, 2nd layer, 3rd layer | | 17, 150, 83 | 23, 172, 55 | 18, 130, 42 | 18, 130, 42 |
| Physical properties | | | | | |
| Transparency (%) | | 91.5 | 91 | 91 | 91 |
| Haze (%) | | 12 | 11 | 10 | 10 |
| Tensile modulus (MPa) | | 240 | 220 | 230 | 240 |
| Test for containers of aqueous injection | | | | | |
| Residue on ignition (judgment) | | 0.02% (pass) | 0.03% (pass) | 0.02% (pass) | 0.02% (pass) |
| Heavy metal (judgment) | | ND (pass) | ND (pass) | ND (pass) | ND (pass) |
| Lead (judgment) | | ND (pass) | ND (pass) | ND (pass) | ND (pass) |
| Cadmium (judgment) | | ND (pass) | ND (pass) | ND (pass) | ND (pass) |
| Foaming (judgment) | | <3 min (pass) | <3 min (pass) | <3 min (pass) | <3 min (pass) |
| pH (judgment) | | <0.1 (pass) | <0.1 (pass) | <0.1 (pass) | <0.1 (pass) |
| Substance reduced by potassium permanganate (judgment) | | <0.2 ml (pass) | <0.2 ml (pass) | <0.2 ml (pass) | <0.2 ml (pass) |
| UV (220–241 nm) (judgment) | | <0.01 (pass) | <0.01 (pass) | <0.01 (pass) | <0.01 (pass) |
| UV (241–350 nm) (judgment) | | <0.01 (pass) | <0.01 (pass) | <0.01 (pass) | <0.01 (pass) |
| Residue after evaporation (judgment) | | <0.4 mg (pass) | <0.4 mg (pass) | <0.3 mg (pass) | <0.3 mg (pass) |
| Cytotoxicity test (judgment) | | >100% (pass) | >100% (pass) | >100% (pass) | >100% (pass) |
| TOC | | <1 ppm | <1 ppm | <1 ppm | <1 ppm |
| Drop test (see note) | | Five drops without break | Five drops without break | Five drops without break | Five drops without break |

TABLE 3

|  |  | Comparative Example 1 | Comparative Example 2 |
|---|---|---|---|
| Film construction | | | |
| First layer | [1] PP homopolymer | — | 70% by weight |
| | [2] PP homopolymer | 100% by weight | 30% by weight |
| Second layer | Polypropylene resin [1] | — | 60% by weight |
| | [3] Polyethylene resin | — | 10% by weight |
| | Elastomer [2] | 100% by weight | — |
| | Elastomer [3] | — | 30% by weight |
| Third layer | [1] Ethylene-propylene random copolymer | 100% by weight | — |
| | Ethylene propylene random copolymer [4] | — | 100% by weight |
| Layer thickness ($\mu$m) 1st layer, 2nd layer, 3rd layer | | 18, 130, 42 | 18, 130, 42 |
| Physical properties | | | |
| Transparency (%) | | 82 | 80 |
| Haze (%) | | 25 | 40 |
| Tensile modulus (MPa) | | 270 | 270 |
| Test for containers of aqueous injection | | | |
| Residue on ignition (judgment) | | 0.07% (pass) | 0.04% (pass) |
| Heavy metal (judgment) | | ND (pass) | ND (pass) |
| Lead (judgment) | | ND (pass) | ND (pass) |
| Cadmium (judgment) | | ND (pass) | ND (pass) |
| Foaming (judgment) | | >3 min (not pass) | >3 min (not pass) |
| pH (judgment) | | <0.1 (pass) | <0.1 (pass) |
| Substance reduced by potassium permanganate (judgment) | | <0.2 ml (pass) | <0.2 ml (pass) |
| UV (220–241 nm) (judgment) | | <0.04 (pass) | <0.04 (pass) |
| UV (241–350 nm) (judgment) | | <0.06 (not pass) | <0.03 (pass) |
| Residue after evaporation (judgment) | | <0.8 mg (pass) | <0.5 mg (pass) |
| Cytotoxicity test (judgment) TOC | | Not carried out * | Not carried out ** |
| Drop test (see note) | | Broke at 3rd drop | Broke at 3rd drop |

Note to Tables 1 to 3
Drop test was carried out by dropping a sample bag five times from a height of 1.8 meters. The sample bag measures 140 mm by 220 mm inside, and is filled with 500 ml of purified water. Dropping is preceded by sterilization with high-pressure steam at 121° C. for 30 minutes.
* Not carried out because the sample failed in transparency and dissolution test.
** Not carried out because the sample failed in transparency, haze, and dissolution test.
ND: not detected
[1] Polypropylene resin: ethylene-propylene block copolymer having an MFR of 2.5 g/10 min at 230° C. and a density of 900 kg/m$^3$, from Sumitomo Chemical Co., Ltd.
[2] Elastomer: polyester elastomer having an MFR of 10 g/10 min at 230° C. and a density of 1130 kg/m$^3$, from Eastman.
[3] Elastomer: propylene elastomer having an MFR of 10 g/10 min at 230° C. and a density of 890 kg/m$^3$, from Sumitomo Chemical Co., Ltd.
[4] Ethylene-propylene random copolymer: copolymer of ethylene and propylene, having an MFR of 2.5 g/10 min at 230° C. and a density of 900 kg/m$^3$, from Sumitomo Chemical Co., Ltd.

The present invention provides a plastic film from which to make medical liquid containers. This plastic film is superior in transparency, flexibility, heat resistance, strength, drop strength, and sealability, and free from sticky touch. The container made from the plastic film causes no problem of dissolution in the content liquid and is hardly subject to whitening immediately after sterilization with high-pressure steam. In addition, the plastic film is capable of high-frequency fusion cutting and sealing when it is formed into containers. It meets all the requirements for the material for medical liquid containers.

What is claimed is:

1. A plastic film for medical liquid containers which comprises at least three layers, wherein the three layers are:
   a first layer composed mainly of propylene homopolymer which is a mixture of two or more kinds of propylene homopolymer in a ratio of from 1:9 to 9:1 (by weight), the first one having a melt flow rate of 0.1–5 g/10 mm at 230° C. and a density of 880–913 kg/m$^3$, and the second one having a melt flow rate of 5–50 g/10 mm at 230° C. and a density of 880–913 kg/m$^3$, such that the resulting mixture has a melt flow rate no higher than 5 g/10 mm at 230° C.;
   a second layer containing polypropylene resin, polyethylene resin and thermoplastic elastomer; and
   a third layer composed mainly of copolymer of propylene and other monomers and functions as a sealing layer;
   wherein said three layers are laminated without the aid of a bonding layer;
   each layer does not contain a non-elastomeric block copolymer of benzene-ring-free olefin and propylene; and
   said second layer acts as an intermediate layer in the plastic film.

2. A The plastic film for medical liquid containers as defined in claim 1 wherein said second layer is composed of 50–85 parts by weight of said polypropylene resin, 5–30 parts by weight of said polyethylene resin, and 10–40 parts by weight of said thermoplastic elastomer.

3. The plastic film for medical liquid containers as defined in claim 1, wherein said polypropylene resin contained in said second layer is a random copolymer of propylene and ethylene, with the ethylene content being 5–30% by weight.

4. A The plastic film for medical liquid containers as defined in claim 1, wherein said polyethylene resin contained in said second layer is a linear low-density polyethylene having a melt flow rate of 0.1–10 g/10 mm at 190° C. and a density of 850–980 kg/m³.

5. The plastic film for medical liquid containers as defined in claim 1, wherein said thermoplastic elastomer contained in said second layer is a styrene-based elastomer.

6. The plastic film for medical liquid containers as defined in claim 1, wherein said second layer additionally contains a resin capable of high-frequency dielectric heating, so that it permits high-frequency fusion cutting and sealing.

7. The plastic film for medical liquid containers as defined in claim 6, wherein the resin capable of high-frequency dielectric heating is a polyamide resin.

8. The plastic film for medical liquid containers as defined in claim 1, wherein said copolymer contained in said third layer is a random copolymer of propylene and ethylene, with the ethylene content being 5–30% by weight.

9. The plastic film for medical liquid containers as defined in claim 1, wherein said copolymer contained in said third layer is a random copolymer of propylene which has a melt flow rate of 1–8 g/10 mm at 230° C. and a density of 850–980 kg/m³.

10. The plastic film for medical liquid containers as defined in claim 1, wherein the copolymer of propylene and other monomers which is contained in said third layer is a non-elastomeric copolymer of propylene and other monomers, a propylene-based elastomer, or a mixture of said non-elastomeric copolymer and said propylene-based elastomer.

11. The plastic film for medical liquid containers as defined in claim 1, which has a total light transmission no lower than 85% (according to JIS K7105) and a haze value no higher than 25% (according to JIS K7105) measured immediately after sterilization with high-pressure steam at 121° C. for 30 minutes.

12. The plastic film for medical liquid containers as defined in claim 1, which has a tensile elastic modulus no higher than 300 MPa (according to JIS K7127) measured immediately after sterilization with high-pressure steam at 121° C. for 30 minutes.

13. The plastic film for medical liquid containers as defined in claim 1, wherein said first layer has a thickness of 5–20 µm, said second layer has a thickness of 100–300 µm, and said third layer has a thickness of 30–120 µm.

* * * * *